United States Patent [19]
Sköld et al.

[11] Patent Number: 5,933,768
[45] Date of Patent: Aug. 3, 1999

[54] RECEIVER APPARATUS, AND ASSOCIATED METHOD, FOR RECEIVING A RECEIVE SIGNAL TRANSMITTED UPON A CHANNEL SUSCEPTIBLE TO INTERFERENCE

[75] Inventors: Johan Sköld, Åkersberga; Mikael Höök, Sollentuna; Nils Edvardsson, Stockholm, all of Sweden

[73] Assignee: Telefonaktiebolaget L/M Ericsson, Stockholm, Sweden

[21] Appl. No.: 08/808,823

[22] Filed: Feb. 28, 1997

[51] Int. Cl.[6] .................................................. H04B 1/10
[52] U.S. Cl. .......................................... 455/296; 375/346
[58] Field of Search ................................. 455/296, 303, 455/304, 305, 226.1, 226.3; 375/346, 348, 349

[56] References Cited

U.S. PATENT DOCUMENTS

| | | | |
|---|---|---|---|
| 5,005,188 | 4/1991 | Clark | 375/348 |
| 5,148,548 | 9/1992 | Meche et al. | 455/296 |
| 5,155,742 | 10/1992 | Ariyavisitakul et al. | 375/13 |
| 5,222,101 | 6/1993 | Ariyavisitakul et al. | 375/13 |
| 5,373,507 | 12/1994 | Sköld | 370/105.1 |
| 5,375,143 | 12/1994 | Kazecki et al. | 375/14 |
| 5,479,446 | 12/1995 | Mourot | 375/346 |
| 5,519,727 | 5/1996 | Okanoue et al. | 375/232 |
| 5,524,124 | 6/1996 | Koenig | 375/229 |
| 5,537,443 | 7/1996 | Yoshino et al. | 375/348 |
| 5,640,432 | 6/1997 | Wales | 375/346 |
| 5,673,288 | 9/1997 | Okanoue | 375/348 |
| 5,697,086 | 12/1997 | Svoboda | 455/304 |
| 5,732,112 | 3/1998 | Langberg | 375/349 |
| 5,784,466 | 7/1998 | Whitecar et al. | 455/303 |

FOREIGN PATENT DOCUMENTS

| | | |
|---|---|---|
| 0 440 920 A2 | 8/1991 | European Pat. Off. . |
| 0 667 683 A2 | 8/1995 | European Pat. Off. . |
| WO 96/11533 | 4/1996 | WIPO . |
| WO 96/11534 | 4/1996 | WIPO . |
| WO 96/13909 | 5/1996 | WIPO . |

OTHER PUBLICATIONS

Pekka A. Ranta, Ari Hottinen and Zhi–Chun Honkasalo; *Co–Channel Interference Cancelling Receiver for TDMA Mobile Systems*; IEEE 1995, pp. 17–21.

Bo Hagerman; *Downlink Relative Co–Channel Interference Powers in Cellular Radio Systems*; IEEE 1995, pp. 366–370.

S.W. Wales; *Technique for Co–Channel Interference Suppression in TDMA Mobile Radio Systems*; IEE Proc.–Commun., vol. 142, No. 2, Apr. 1995, pp. 106–114.

G. David Forney, Jr.; *Maximum–Likelihood Sequence Estimation of Digital Sequences in the Presence of Intersymbol Interference*; IEEE Transactions on Information Theory, vol. IT–18, No. 3, May 1972, pp. 363–378.

Nils Edvardsson; *Studies of Joint Detection—MLSE in the GSM–System*; Master of Science Thesis in Signal Processing and Digital Communication, Stockholm, Jun. 1996, pp. 1–72.

Pekka A. Ranta, Zhi–Chun Honkasalo, and Jukka Tapaninen; *TDMA Cellular Network Application of an Interference Cancellation Technique*; IEEE 1995, pp. 296–300.

*Primary Examiner*—Thanh Cong Le
*Attorney, Agent, or Firm*—Jenkens & Gilchrist

[57] ABSTRACT

Apparatus, and an associated method, for estimating an interfering-signal component portion of a receive signal received at a receiver. The training sequence associated with the interfering-signal component portion is determined, even without prior knowledge of the training sequence associated with such interfering-signal component portion. Once the training sequence of the interfering-signal component portion is determined, the receive signal is selectively, jointly-detected utilizing a joint detector, the interfering-signal component portion of the receive signal is better able thereby to be canceled or otherwise suppressed.

18 Claims, 3 Drawing Sheets

RECEIVER APPARATUS, AND ASSOCIATED METHOD, FOR RECEIVING A RECEIVE SIGNAL TRANSMITTED UPON A CHANNEL SUSCEPTIBLE TO INTERFERENCE

The present invention relates generally to digital receivers operable to receive a receive signal transmitted upon a channel susceptible to interference, such as co-channel interference. More particularly, the present invention relates to apparatus, and an associated method, for identifying an interfering-signal component portion of the signal received by the receiver and for selectively suppressing the interfering-signal component portion out of the receive signal.

The interfering-signal component portion is identified even without prior knowledge of a training sequence associated with, and forming a portion of, the interfering signal component portion. The receive signal is analyzed, first to identify a training sequence associated with an interfering signal component portion. And, a determination is made of the manner by which to recover best the wanted-signal component of the receive signal. A selection is made either to recover the wanted-signal component of the receive signal, e.g., by jointly detecting an interfering-signal component portion together with the wanted-signal component and thereby suppressing the interfering-signal component portion, or to recover the wanted-signal component by detecting merely the wanted-signal component of the receive signal.

When embodied in a cellular communication system, operation of an embodiment of the present invention facilitates better suppression of co-channel interference. Because co-channel interference is better able to be suppressed, channels defined in a cellular communication system can be reused in a more efficient manner, thereby to increase system capacity. For example, the number of cells forming a cell cluster pattern can be reduced.

BACKGROUND OF THE INVENTION

Utilization of digital communication techniques to communicate information between a sending station and a receiving station has become increasingly popular in recent years. Radio communication systems, such as cellular communication systems, are exemplary of communication systems which are increasingly constructed to utilize digital communication techniques.

Communication channels formed between the sending and receiving stations of a radio communication system are defined upon a portion of the electromagnetic spectrum, the "bandwidth", allocated to the system. The channels are defined, at least in part, upon carrier frequencies, "carriers", within the allocated bandwidth. The bandwidth allocated, and available, to a radio communication system is usually limited. And, the communication capacity of the radio communication system is defined, inter alia, by, and limited by, the bandwidth allocated to the system.

In a multi-user radio communication system, such as a cellular communication system, communication capacity limitations sometimes prohibit additional users from utilizing the communication system as a result of bandwidth limitations. By utilizing more efficiently the bandwidth allocated to the communication system, the communication capacity of the system can be increased.

The bandwidth allocated to a radio communication system can be more efficiently utilized if digital communication techniques are used to transmit information-containing communication signals upon channels forming links between a sending station and a receiving station.

When a communication signal is formed utilizing a digital communication technique, an information signal is sometimes digitized and modulated upon a carrier utilizing a selected modulation technique, such as, for example, a QPSK (Quadrature Phase Shift Keying) or a GMSK (Gaussian Minimum Shift Keying) technique. Use of other modulation techniques are sometimes alternately utilized. Because the information signal is digitized, the communication signal formed therefrom can be transmitted by a sending station upon a communication channel in discrete bursts. When the communication signal is transmitted in discrete bursts, the bursts are concatenated theretogether at the receiving station.

Because communication signals can be transmitted in discrete bursts, time division multiplexing of a carrier is permitted. Two or more channels can be defined upon a single carrier.

In at least one type of cellular communication system, a system constructed pursuant to the operational specification of the Global System for Mobile communications (GSM), a digital communication technique is utilized. Carriers of the bandwidth allocated to the communication system are divided into eight time slots. Eight-way time division multiplexing is provided in such a communication system, and bursts of communication signal portions are transmitted between a sending station and a receiving station on selected ones of such time slots. Carrier/time slot combinations form the communication channels upon which the communication signals are transmitted.

Standard protocols set forth in the GSM operational specification, define the structure of normal bursts communicated during time slots defined in the GSM system. The communication signal portions transmitted during the time slots defined in the GSM system are divided at least into a data field and a training sequence field. The training sequence field is formed of a series of bits, known to the receiving station. The purpose of transmitting known bits to the receiver is to allow the receiver to equalize the channel. Typically, the signal is distorted when it propagates through the radio medium and the equalization allows for the receiver to estimate the channel impulse response, i.e., how this distortion has affected the signal during its transmission to the receiver.

Such training sequence bits are utilized at the receiving station to facilitate detection of the informational content of the data fields communicated together with the training sequence field.

Cellular communication systems, both those utilizing conventional analog techniques and also those utilizing digital communication techniques, define cells throughout a geographical area encompassed by the cellular communication system. Collections of cells form cell clusters. In each cell cluster, the total available bandwidth allocated to the communication system is utilized. In successive cell clusters, the allocated bandwidth is reused. The communication capacity, limited by the number of channels which can be defined upon the allocated bandwidth, is effectively increased by reusing the channels in each of the cell clusters.

A problem sometimes associated with reuse of the bandwidth is co-channel interference. When communication signals are transmitted concurrently in different cells upon the same communication channel, such concurrently-transmitted signals sometimes interfere with one another; such interference is referred to as co-channel interference.

Co-channel interference makes detection of the wanted-signal received at a receiving station more difficult. If levels of co-channel interference are significant, the quality of the signal detection might be inadequate.

Receiving stations which receive communication signals generated utilizing digital communication techniques sometimes include equalizer circuitry to facilitate signal detection of the informational content of a communication signal received at the receiving station. Typically, the training sequence forming a portion of a communication signal is utilized by the equalizer to facilitate the detection of the informational content of the wanted-signal received at the receiving station.

When the receive signal received at the receiving station is formed of both a wanted-signal component and also an interfering-signal component, an equalizer can be constructed to jointly detect both the wanted-signal component and the interfering-signal component. In such an equalizer, however, the training sequences associated with both the wanted-signal component and the interfering-signal component must typically both be known. While the training sequence associated with the wanted-signal component is typically known to the receiving station, the training sequence associated with an interfering-signal component portion forming at least a portion of the interfering-signal component is not necessarily and, typically is not, known to the receiving station. Without knowledge of the training sequence of the interfering-signal component portion, existing receiving stations are typically unable to properly detect and suppress such an interfering-signal component portion of a receive signal.

A manner by which to permit a receiving station to determine better the interfering-signal component portion of a receive signal received at the receiving station would be advantageous. By better detecting the interfering-signal component portion, suppression of such interfering-signal component portion can be better effectuated. Thereby, bandwidth reuse can be made more efficient, resulting in increased communication capacities of the communication system.

It is in light of this background information related to digital receivers that the significant improvements of the present invention have evolved.

SUMMARY OF THE INVENTION

The present invention advantageously provides apparatus, and an associated method, for identifying an interfering-signal component portion of a receive signal which is most advantageous to suppress at the detector in a receiving station. Once identified, the interfering-signal component portion is selectively suppressed out of the receive signal. The interfering-signal component portion is suppressed if such suppression would facilitate detection of a wanted-signal component portion of the receive signal.

Operation of an embodiment of the present invention estimates one or more interfering-signal component portions without requiring training sequences associated with the one or more interfering-signal component portions to be known in advance. The receive signal is analyzed, first to determine the training sequence associated with the one or more interfering-signal component portions.

Thereafter, a selection is made of the manner by which to detect the wanted-signal component of the receive signal. The wanted-signal component is detected either by jointly detecting the interfering-signal component portion together with the wanted-signal component or by detecting merely the wanted-signal component of the receive signal.

In one aspect of the present invention, apparatus and method is embodied in a cellular communication system to facilitate the detection of a wanted-signal component received at a receiving station. The receiving station is formed of a mobile terminal when downlink signals are transmitted thereto. And, the receiving station is formed of a radio base station of the network infrastructure of the cellular communication system when uplink signals are transmitted thereto.

By providing the capability to identify, detect, and possibly suppress the interfering-signal component portion even without prior knowledge of the training sequence associated therewith, the receiving station is sometimes better able to recreate the informational content of the wanted-signal component.

Better suppression of co-channel interference is facilitated through operation of an embodiment of the present invention. Because of such improved ability to suppress such interference, the channels defined in a cellular communication system are able to be reused in a more efficient manner, thereby to permit an increase in the communication capacity of the system.

In another aspect of the present invention, the wanted-signal component of the receive signal is detected jointly with an interfering-signal component portion. A joint channel estimate is calculated for the wanted signal in addition to an interfering signal component portion or more than one interfering signal component portion. A value of residual interference is calculated for each of the calculated estimates. The value of residual interference is an indication of the interference remaining after detection. The interfering-signal component portion that can be most efficiently suppressed is that which exhibits a lowest estimate of residual interference. The most efficient suppression is, e.g., that which permits maximization of the quality of the detected, wanted data. Such an interfering-signal component portion is suppressed out of the receive signal. And, further receiver operations are thereafter performed upon the remaining signal portion.

In another aspect of the present invention, a channel estimate is further made of only the wanted-signal component and a value of residual interference is calculated therefrom. The calculated value is compared with the value of residual interference of the lowest value calculated for joint channel estimation. Utilization of the joint detector is made if the residual interference calculated therefrom is of a lower value than the value of residual interference calculated responsive to the single-channel detector. And, if the residual interference value generated responsive to the single-channel detector is of a lesser value than the residual interference calculated responsive to the joint detector, the single-channel detector is instead utilized. Thereby, the training sequence associated with an interfering-signal component portion of a receive signal that is most efficiently suppressed is determined and, utilization of a signal generated by a joint detector or a single-channel detector is further made. In analogous fashion, more than one interfering-signal component portion can also be suppressed.

In still another aspect of the present invention, apparatus, and an associated method, is operable in a radio receiver which receives a receive signal. The receive signal is formed of a wanted-signal component and an interfering-signal component. The interfering-signal component is formed of at least one interfering-signal component portion. The wanted-signal component has a first training sequence associated therewith. And, the at least one interfering-signal component portion has at least a second training sequence associated therewith. The first and at least second training sequences, respectively, are selected from a set of training sequences. The first training sequence is of a value known to the receiver at least when the signal is received at the receiver. The apparatus, and the method, determines the value of the at least second training sequence. A channel estimator is coupled to receive at least indications of the receive signal received at the receiver. The channel estimator generates groups of channel estimates wherein the channel estimates of each group are representative of characteristics of estimated channels estimative of channels upon which the receive signal is transmitted to the receiver. The channel estimates of each group include estimates of channels upon which interfering-signal component portions are transmitted. The interfering-signal component portions have associated therewith training sequences of the set of training sequences. A residual interference estimator is coupled to receive indications of the estimates formed by the channel estimator. The residual interference estimator generates values of residual interference estimated by the residual interference estimator. The selector selects a group of the channel estimates of the groups of channel estimates estimated by the channel estimator which exhibit a value of residual interference of a desired value. The training sequence or sequences associated with the group of channel estimates selected by the selector is determined to be the value of the at least second training sequence.

In another aspect of the present invention, the wanted-signal component of the receive signal is detected in addition to one or more of the interfering-signal component portions. The interfering-signal component portions are first identified in an estimator by recognition of, e.g., a training sequence for the interfering-signal component portions. The estimator also generates a quality measure for the receive signal. The quality measure reflects the quality of the wanted-signal component after detection, e.g., of a measure of residual interference. For every combination of estimations of wanted-signal component and interfering-signal component portions possible for a known number of interferers to detect, a quality measure is determined. An interference detector then selects to detect the combination of wanted-signal component/interfering-signal component portions that are most advantageous to detect, according to the quality measure generated.

In these and other aspects, therefore, an apparatus, and associated method, facilitates processing of a receive signal received at a radio receiver. The receive signal is formed of a wanted-signal component portion and at least one interfering-signal component portion. A quality measure determiner is coupled to receive at least indications of the receive signal. The quality measure determiner forms at least one quality measure of the receive signal. An interference detector is also coupled to receive the at least indications of the receive signal and indications of the at least one quality measure of the receive signal determined by the quality measure determiner. The interference detector detects the wanted-signal component portion of the receive signal and selectively suppresses the at least one interfering signal component portion.

A more complete appreciation of the present invention and the scope thereof can be obtained from the accompanying drawings which are briefly summarized below, the following detailed description of the presently-preferred embodiments of the invention, and the appended claims.

DETAILED DESCRIPTION OF THE PRESENT INVENTION

Figure 1:
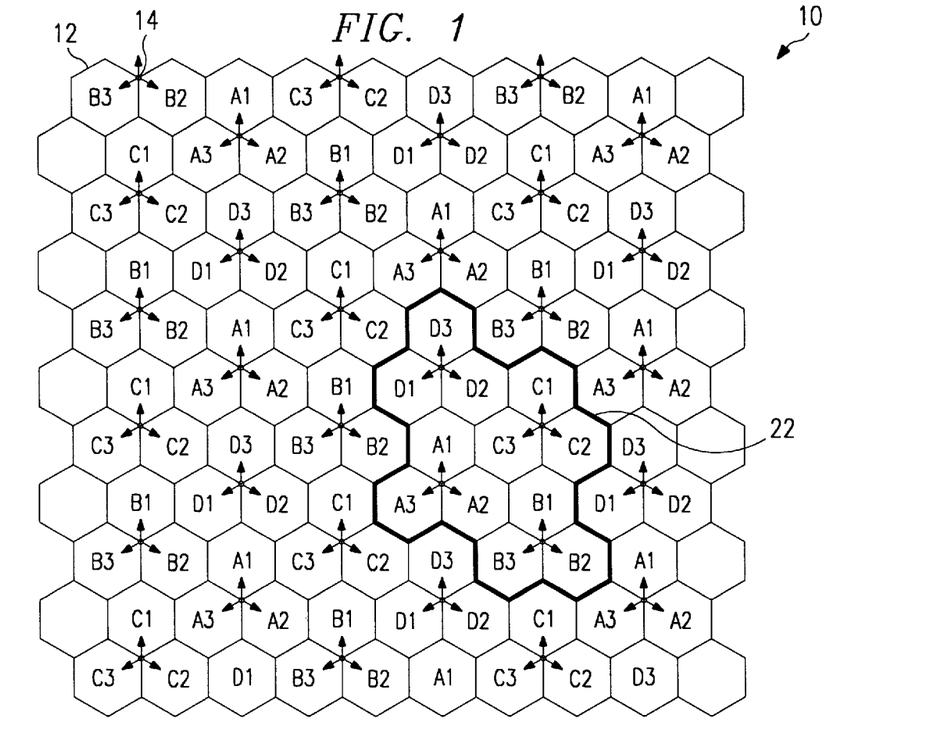
FIG. 1 illustrates a 4:12 cell reuse pattern sometimes utilized to allocate channels available to be used in a cellular communication system.

Referring first to FIG. 1, an exemplary grid pattern, shown generally at 10, is illustrative of a channel allocation pattern defined in an exemplary cellular communication system. The grid pattern pictorially illustrates the manner by which groups of channels are reused throughout a geographical area encompassed by the system.

Hexagonally-shaped cells 12 are defined by radio base stations 14. Typically, the hexagonal pattern exists only for cell planning purposes and it is to be understood that the actual coverage provided by the base stations and antenna sites is typically not hexagonal. The radio base stations 14 form portions of cellular network infrastructure equipment of the cellular communication system.

In the grid pattern 10 illustrated in FIG. 1, each radio base station 14 defines three cells 12. Generally, a mobile terminal (not shown) positioned in one of the cells 12 transceives communication signals to and from the radio base station 14 which defines the cell in which the mobile terminal is positioned. Utilization of a cellular communication system is advantageous as continued communication with the mobile terminal is possible even as the mobile terminal passes through successive ones of the cells 12. Communication "handoffs" between radio base stations 14 defining the successive ones of the cells 12 permit such continued communication, all without apparent interruption of ongoing communications.

As noted previously, a significant advantage of a cellular communication system arises due to the ability to reuse channels defined in the bandwidth allocated to the communication system. Different groups of channels are assigned to be used at different ones of the cells 12. And, such channel assignments are repeated in successive groups of the cells. While typically, channel assignments of adjacent cells 12 are dissimilar, the channel assignments are repeated over the successive groups of cells.

The grid pattern 10 shown in FIG. 1 is sometimes referred to as a "4:12" scheme. In such a scheme, the channels allocated to the cellular communication system are divided into twelve channel-groups. The groups are designated in the figure by A1, A2, A3, B1, B2, B3, C1, C2, C3, D1, D2, and D3. Groups of twelve cells, such as the group 22 indicated by the bold-face outline in the figure, are defined throughout the pattern 10. The channels assigned to each cell of the twelve-cell group is assigned a different set of channels, and adjacently-positioned cells are not assigned with the same channels. Interference between signals generated in adjacently-positioned cells is thereby reduced.

As also mentioned previously, to increase the capacity of the cellular communication system, the cells can be re-used more frequently, albeit at the risk of an increase in the possibility that interference of concurrently-generated communication signals might be more likely to occur.

Figure 2:
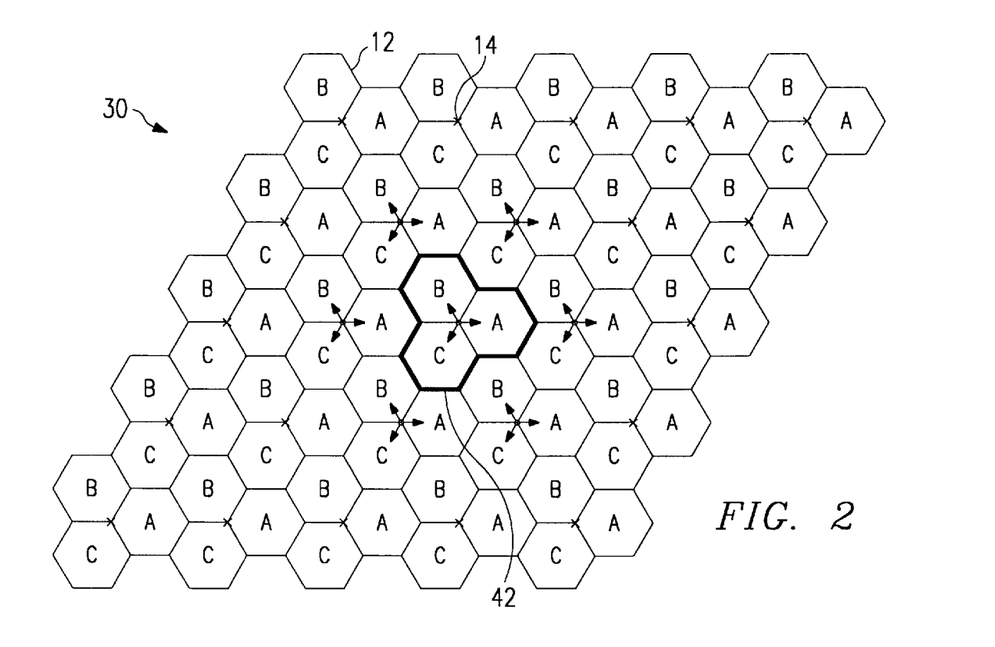
FIG. 2 illustrates a cell reuse pattern, similar to that shown in FIG. 1, but of a 1:3 channel reuse pattern.

FIG. 2 illustrates another exemplary grid pattern, shown generally at 30, illustrative of another channel allocation pattern. The pattern 30 is sometimes referred to as a "1:3" scheme. Similar to the arrangement shown in FIG. 1, hexagonally-shaped cells 12 are defined by radio base stations 14. Each base station 14 defines three cells 12, in manners analogous to the manners by which the base stations 14 define the cells 12 in the illustration of FIG. 1.

In a 1:3 scheme, the channels of the bandwidth allocated to the cellular communication system are divided into three groups. In such a scheme, the channels allocated to the communication system are divided into three channel-groups. The groups are designated in the figure by A, B, and C. Groups of three cells, such as the group 42, indicated by the bold-faced outline, are formed throughout the grid pattern 30. Each cell of the group 42 is defined with a different one of the three sets of allocated channels. The sets of channels, again, are assigned in manners such that adjacent ones of the cells are not assigned with the same set of frequency channels.

Because the allocated channels are divided into three sets of channels rather than twelve sets of channels, a multiple-increase in channels available upon which to transmit communication signals at any particular cell results. Viz., up to a four-fold increase in communication capacity is possible. However, the separation distance between cells which reuse the same set of channels is reduced, in contrast to the reuse pattern of the 4:12 scheme shown in FIG. 1.

Degradation levels of communication quality resulting from co-channel interference is therefore of a potentially greater concern in a cellular communication system which utilizes the 1:3 scheme rather than the 4:12 scheme. If increased levels of co-channel interference significantly interfere with communications when a 1:3 communication scheme is utilized, the benefits of the increased communication capacity permitted by the utilization of a 1:3 communication scheme might be offset by increased levels of co-channel interference. If significant, the levels of co-channel interference, in fact, might seriously degrade the quality of communications, wholly obviating the possibility of increasing the communication capacity of the 1:3 allocation scheme.

Operation of an embodiment of the present invention provides a manner by which to identify a co-channel, interfering signal at a receiving station, thereby to permit better suppression of such interfering signal.

Figure 3:
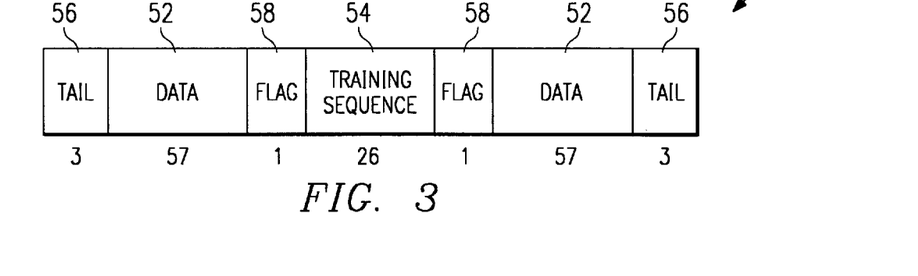
FIG. 3 illustrates an exemplary frame structure of a burst into which bits transmitted between a sending station and a receiving station of a communication system are formatted.

FIG. 3 illustrates a burst 50, exemplary of a burst into which data bits of a communication signal are formatted in an exemplary, cellular communication system. The burst 50 is representative of a burst formatted during operation of transmitter apparatus of a GSM cellular communication system. Other manners by which a communication signal can be formatted can similarly be represented.

As illustrated, the burst 50 includes two fields of data 52, each of fifty-seven bit lengths. A training sequence 54 of a twenty-six bit-length is positioned between the two data fields 52. Three-bit length tails 56 are formed at the opposing ends of the burst 50. The bit values of the tails 56 are of zero values. The bits forming the data fields 52 contain speech or other types of source information or signaling information. Single bit length flags 58 positioned between the data fields 52 and the training sequence 54 are of values indicative of the type of information of which the fields 52 are formed. Successive bursts, or "frames" formatted therefrom, are communicated between a sending and a receiving station, such as the radio base stations 14 shown in FIGS. 1 and 2, and a mobile terminal to communicate information therebetween.

Figure 4:
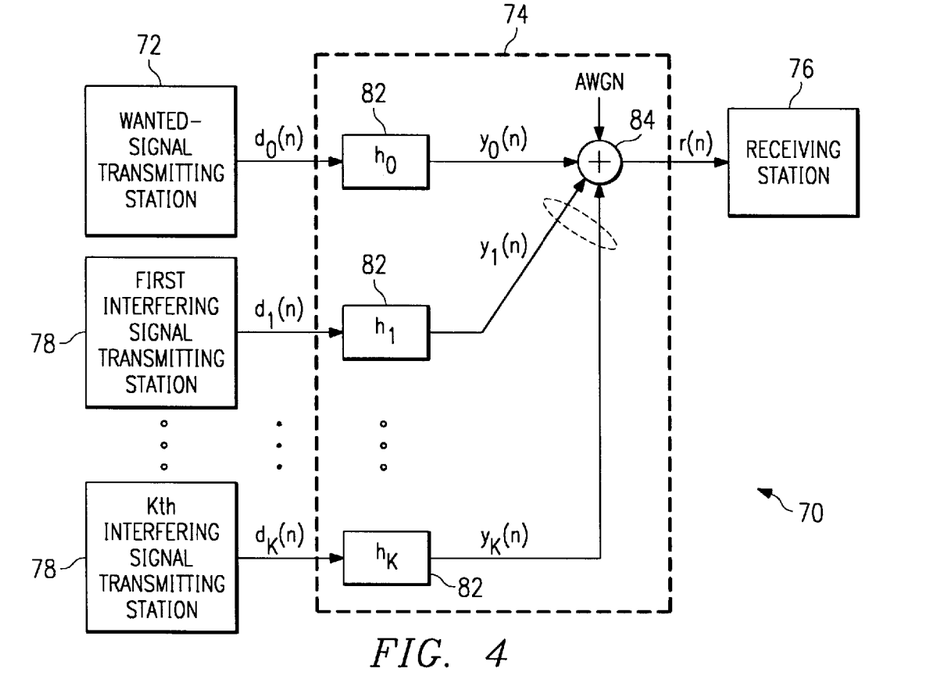
FIG. 4 illustrates a functional block diagram of a model of a communication system having a communication channel upon which co-channel, interfering-signal components are received together with a wanted-signal component at a receiving station.

FIG. 4 illustrates an exemplary communication system, shown generally at 70, representative of the cellular communication system having a cell reuse plan such as that represented by the grid pattern 30 shown in FIG. 2. In the illustrated system 70, a wanted-signal transmitting station 72 generates a transmit signal which is transmitted upon a communication channel 74 to a receiving station 76. The wanted-signal transmitting station 72 is representative of, for example, the radio base station 14, shown in FIG. 2, which generates downlink signals for transmission to a mobile terminal, here represented by, for example, the receiving station 76. The station 72, conversely, can be representative of a mobile terminal when the mobile terminal is operable to transmit an uplink signal to a radio base station.

Additional transmitting stations 78 are representative of transmitting stations which generate interfering signals which interfere with the wanted-signal generated by the transmitting station 72. A K number of interfering-signal transmitting stations 78 are illustrated in the figure. Each of such transmitting stations 78 transmit interfering signals upon the communication channel 74 and which are received by the receiving station 76. Such transmitting stations 78 are representative, for example, of radio base stations which generate signals on the same channel upon which the transmitting station 72 transmits signals, thereby to form co-channel interfering signals which interfere with the wanted-signal generated by the transmitting station 72.

The channels 82 upon which the signals are transmitted by the transmitting station 72 and stations 78 can be modeled by discrete-time channel filters containing a channel impulse response. Such filters are in the model represented by, for example, multi-tap, FIR(Finite Impulse Response) filters. The channels 82 illustrated in the figure are representative of the channels upon which the signals are transmitted, and such channels are indicated by the designation $h_0, h_1 \ldots h_k$. Each of the channels 82 is of potentially differing characteristics responsive to the paths upon which the signals are transmitted to the receiving station 76. Collectively, the channels 82 upon which the signals generated by the transmitting stations 72 and 78, respectively, are transmitted form the communication channel 74.

Although the receiving station 76 is intended to receive only the wanted-signal generated by the transmitting station 72, the receive signal actually received by the receiving station 76 is the summation of all of the signals transmitted upon the different channels 82. Such summation of the different signals is represented in the figure by the summation element 84. Additional distortion caused by white Gaussian noise forms an additional component of the summed signal forming the receive signal received at the receiving station 76.

Figure 5:
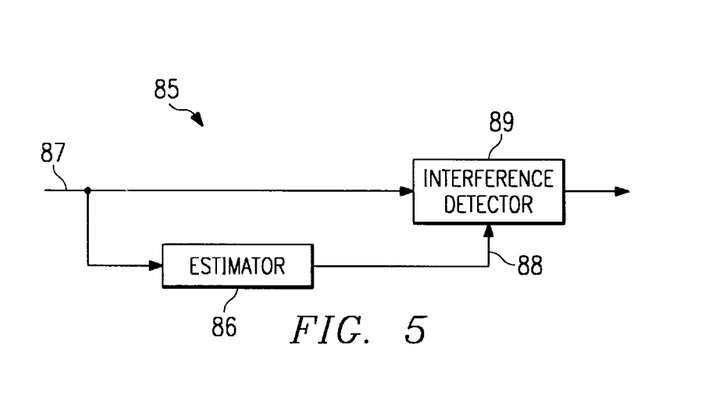
FIG. 5 illustrates a functional block diagram of the apparatus of an embodiment of the present invention which forms a portion of the receiving station shown in FIG. 4.

FIG. 5 illustrates apparatus 85 which forms a portion of the receiving station 76 shown in FIG. 4 in an exemplary embodiment of the present invention. The apparatus 85 is operable to identify and possibly suppress one or more interfering-signal component portions of a receive signal received at the receiving station.

While the following description of an exemplary embodiment is described generally with respect to a communication system in which it is generally desirable to suppress interfering signal component portions, in an embodiment in which the present invention is operable in, e.g., a CDMA communication system, the received signal contains at least one wanted signal component portion and possibly a number of interfering signal component portions.

The receive signal, subsequent to down-conversion operations performed by a down-converter (not shown), is applied to an estimator 86 by way of line 87. The estimator 86 is operable to estimate channel impulse responses of a communication channel upon which a wanted-signal component portion and at least one interfering-signal component portion of the receive signal are transmitted. The channel impulse responses may be estimated, for example, through the utilization of a training sequence, or other sequence, of the interfering signal component portion or portions. The estimator 86 generates a signal on line 88 which is applied to an interference detector 89. This signal forms a quality measure of the received-signal by being, e.g., an estimate of the quality of a wanted-signal component portion after detection. A separate quality measure is generated for each combination of wanted-signal components and interfering-signal component portions that are estimated by the estimator 86. Thereby, the estimator 86 forms a signal quality determiner in which the signal formed thereat is an indication of the quality of the wanted-signal component after detection. The interference detector 89 is operable to selectively suppress one or more interfering-signal component portions of the receive signal. The interference suppressor may, for example, be formed of a joint detector, an interference canceler, a multi-user detector, or a subtractive demodulator. An embodiment in which the interference suppressor is formed of a joint detector shall be described below with respect to FIG. 6.

The estimator 86 which generates the signal on the line 88 is operable to estimate channel impulse responses of a channel upon which the wanted signal component and one or more interfering signal component portions are transmitted. The channel impulse response is determined, in one embodiment, by utilizing a sequencer signal which permits for an estimation of the channel impulse response, such as a training sequence of the interfering signal component portion.

Figure 6:
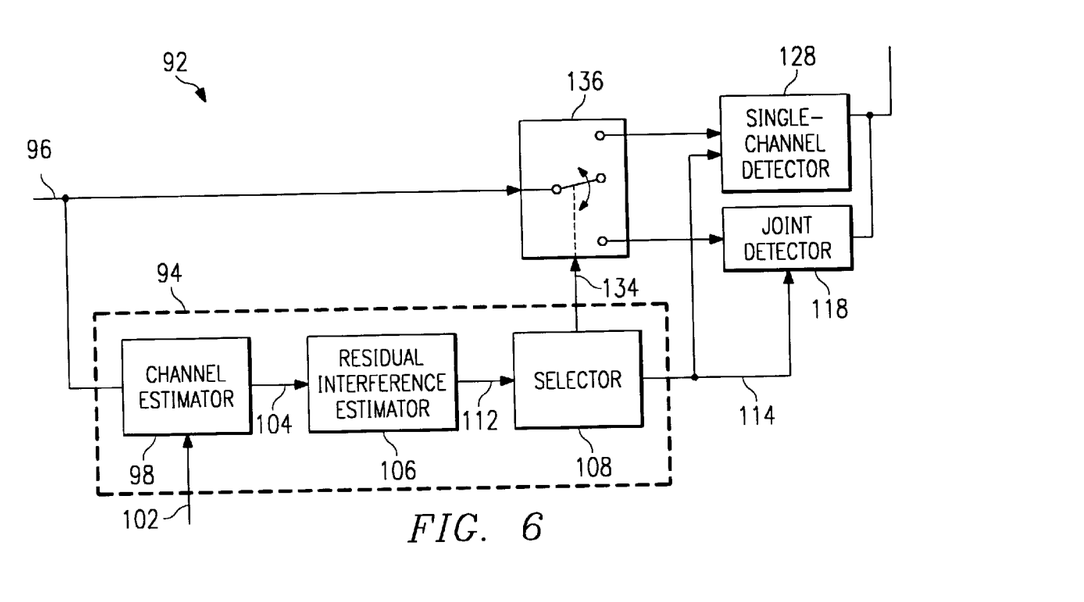
FIG. 6 illustrates another functional block diagram of the apparatus of an embodiment of the present invention which forms a portion of the receiving station shown in FIG. 4.

FIG. 6 illustrates apparatus 92 which forms a portion of the receiving station 76 shown in FIG. 4 in an exemplary embodiment of the present invention. The apparatus 92 is operable to determine one or more interfering-signal component portions of a receive signal received at the receiving station. By determining the component portions of the receive signal which are interfering-signal component portions, such component portions can be jointly detected together with a wanted-signal component and thereby suppressed.

The receive signal, subsequent to down-conversion operations performed by a down-converter (not shown), is applied to an estimator 94 by way of line 96. The estimator 94 is operable to determine the training sequence of one or more interfering-signal component portions of the receive signal generated on the line 96.

The estimator 94 includes a channel estimator 98. The channel estimator is operable to estimate the channels upon which the wanted-signal component and the interfering-signal component portions of the receive signal are transmitted. That is to say, the channel estimator 98 is operable to estimate the channels 82 shown in FIG. 4. The channel estimator 98 is provided with information, here indicated by way of line 102, of the training sequence of the wanted-signal component, wanted to be received by the receiving station of which the apparatus 92 forms a portion.

The training sequences associated with the interfering-signal component portions are, however, not known. Only the set of training sequences available to the communication system is known. Training sequences associated with individual ones of the interfering-signal component portions are selected from such set. The estimator 94, of which the channel estimator 98 forms a portion is operable to extract the training sequences associated with one or more interfering-signal component portions.

The channel estimator 98 estimates groups of channels formed of estimated channels upon which the wanted-signal component is transmitted together with interfering-signal component portions having associated therewith each of the possible training sequences.

The groups of estimates can be estimated, e.g., by joint estimation of the wanted-signal component and at least one interfering-signal component portion. But, the groups of estimates can also be formed by combining individual estimates of the wanted-signal component and estimates of the interfering-signal component portions, respectively.

In one embodiment, channel estimation, $\hat{h}$, is made based upon a least mean square error estimate which is calculated using the following equation:

$$\hat{h} = (M^H M)^{-1} M^H r_T$$

where $^H$ denotes the Hermetian transpose, and M is the matrix defined as:

$$M = [M_0, M_1, \ldots, M_K]$$

and where each $M_i$, i=0,1 ..., K, is a matrix containing the training sequence for user i, $m_i(n), n \in [0, N-1]$, in the following way:

$$M_i = \begin{bmatrix} m_i(L) & m_i(L-1) & \ldots & m_i(0) \\ m_i(L+1) & m_i(L) & \ldots & m_i(1) \\ \ldots & \ldots & & \ldots \\ m_i(N-1) & m_i(N-2) & \ldots & m_i(N-L-1) \end{bmatrix} \quad i = 0, \ldots, K$$

L is the memory of the channels, i.e., for each user, L+1 taps are estimated for the channel impulse responses. N is the length of the training sequence.

Further $r_T$ is a column vector of length N-L containing the received signal during the training sequence. Adopting the above definition, $r_T$ can be expressed as:

$$r_T = Mh + w$$

where w is noise and interference that is not detected.

In the same way the received signal during the data sequence can be expressed as:

$$r_D = Dh + w$$

where D is a matrix defined as:

$$D = [D_0, D_1, \ldots, D_K]$$

where each $D_i$, i=0,1, ..., K, is a matrix containing the data sequence for user i, $d_i(n)$, $n \in [0, N-1]$, defined as:

$$D_i = \begin{bmatrix} d_i(L) & d_i(L-1) & \ldots & d_i(0) \\ d_i(L+1) & d_i(L) & \ldots & d_i(1) \\ \ldots & \ldots & & \ldots \\ d_i(R-1) & d_i(R-2) & \ldots & d_i(R-L-1) \end{bmatrix} \quad i = 0, \ldots, K$$

The residual interference during the training sequence is:

$$R_T = (r_T - M\hat{h})^H (r_T - M\hat{h})$$

and similarly for the data sequence:

$$R_D = (r_D - D\hat{h})^H (r_D - D\hat{h})$$

The expected value for the residual interference for the training sequence is:

$$E\{R_T\} = \ldots = (N - L - (L+1)(K+1))\sigma^2 = u\sigma^2$$

where $\sigma^2$ is the power of the non-detected signal w.
The same can be done for the data sequence:

$$E\{R_T\} = \ldots = (R-L)(\text{Trace}\{(M^H M)^{-1}\} + 1)\sigma^2 = v\sigma^2$$

an estimate of the residual interference for the data sequence, $\hat{R}_D$, can be done by combining the above two equations.

$$\hat{R}_D = \frac{v}{u} R_T$$

While the training sequence of the wanted-signal component is known, the training sequence of interfering-signal component portions must be determined.

To determine the training sequences of the interfering-signal component portions, a joint channel estimate is performed under the assumption that the interfering-signal component portions have particular training sequences. That is to say, $\hat{h}$ is calculated where $M = [M_0 \ M_1]$ and $M_1$ take on all possible training sequences. Then for all the channel estimates, a value of the residual interference during a data-sequence portion is calculated. An estimate of the training sequence for the interfering-signal component portion which exhibits the lowest estimate of the residual interference during a data sequence is selected to be the interfering-signal component which has the most degrading effect upon receiver performance.

A selector 108 is coupled to the residual interference estimator 106 by way of lines 112. The selector 108 is operable, in part, to select the training sequence associated with the value of residual interference at the lowest level and to generate a signal on line 114 representative of such training sequence. A signal representative of a channel estimate is also generated upon the line 114.

The apparatus 92 further includes a joint detector 118. The joint detector 118 is coupled to receive indications of the training sequence and the channel estimate selected by the selector 108 and also, at least selectively, to the line 96 upon which the receive signal is provided. The joint detector 118 is operable to detect jointly the wanted-signal component having the known training sequence and the one or more interfering-signal component portions associated with the one or more training sequences selected by the selector 108. The joint detector may, for example, be implemented utilizing a Viterbi algorithm, in conventional fashion.

By jointly detecting the wanted signal component portion and the at least one interfering-signal component portion, the degradation of the wanted-signal component portion caused by the interfering-signal component portion is substantially reduced, i.e., a suppression of the interfering-signal component portion out of the wanted-signal component portion is achieved.

In the illustrated embodiment, the apparatus 92 further includes a single-channel detector 128. And, in such an embodiment, the channel estimator 98 is further operable to estimate a wanted-signal channel upon which the wanted-signal component of the receive signal is estimated to be transmitted, all without regard to any interfering-signal component portion.

The residual interference estimator 106 is further operable to calculate the residual interference of such an estimated channel, and the selector 108 is further operable to select amongst the channel estimates including such single-channel estimate. If a determination is made by the selector 108 that the single-channel estimate exhibits the lowest level of residual interference, the selector 108 generates a control signal on line 134 which controls a switch position of a switch element 136.

The switch element 136 alternately connects the line 96 to either the joint detector 118 or the single-channel determiner 128. When the residual interference value of the single-channel estimate is of the lowest value, the selector 108 causes the switch element 136 to be positioned to interconnect line 96 with the detector 128. When another of the channel estimates exhibits lower levels of residual interference, the selector 108 causes the switch position of the switch element 136 to be positioned to interconnect the line 96 with the joint detector 118. In such manner, the apparatus detects the receive signal jointly or singly, as appropriate.

Figure 7:
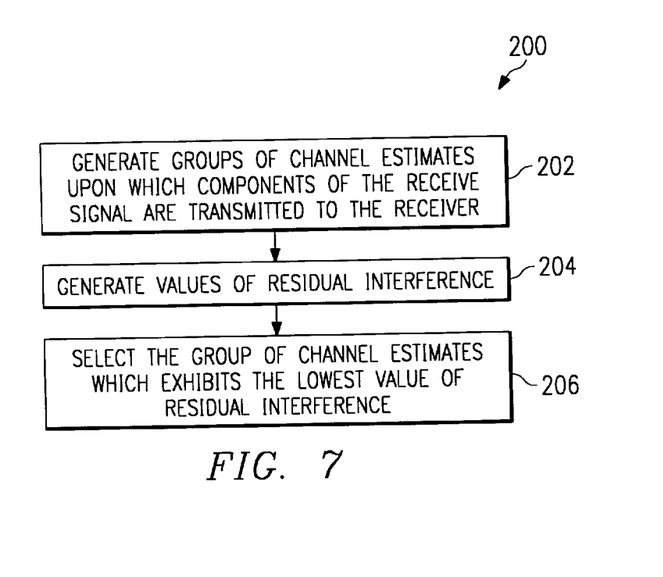
FIG. 7 illustrates a method flow diagram illustrating the method steps of the method of the present invention.

FIG. 7 illustrates a method shown generally at 200, of an embodiment of the present invention. The method 200 is operable to determine the value of a training sequence associated with an interfering component portion of a receive signal. The receive signal is formed of a wanted-signal component and at least one interfering-signal component portion.

First, and as indicated by the block 202, groups of channel estimates are generated responsive to indications of the receive signal. Channel estimates are estimative of channels upon which components of the receive signal are transmitted to the receiver. Then, and as indicated by the block 204, values of residual interference are generated for each of the groups of channel estimates. And, as indicated by the block 206, a selection is made of the group of channel estimates which exhibits the lowest value of residual interference. Such levels of residual interference are indicative of the interference-signal component portion. The training sequences associated with the channel estimates are determined to be the value of the training sequence.

Operation of an embodiment of the present invention permits an interfering-signal component portion to be detected even without prior knowledge of a training sequence associated with such portion. A receive signal received at a receiver is analyzed, first to determine a training sequence associated with the interfering-signal component portion. And, a determination is made of the manner by which to recover best the wanted-signal component of the receive signal. A selection is made either to recover the wanted-signal component by joint detection or by detection of merely the wanted-signal component of the receive signal.

When embodied in receiving station portions of a cellular communication system, such as the receiver portion of a mobile terminal or the receiver portion of a radio base station, better suppression of co-channel interference is facilitated. Because co-channel interference is better able to be suppressed, channels defined in this system can be reused in a more efficient manner, such as the 1:3 cell reuse pattern shown in FIG. 2.

Although the present invention and its exemplary embodiments are primarily explained considering a TDMA communication system, it could equally well be implemented in communication systems that utilize other kinds of access schemes, such as, for example, a slotted CDMA system, where every time slot/frequency is divided into at least two traffic channels, e.g., at least two users. The user separation within the time slot/frequency is in such a case achieved by a code separation, i.e., each user in the same time slot/frequency is assigned a user-specific spreading code. In such a case, a wanted signal component is susceptible to both co-channel and intra-cell interference. If an embodiment of the invention is implemented in, e.g., such a system, it should be appreciated that what earlier has been referred to as interfering-signal component portions actually can be any mixture of interfering-signals and useful signals, at least for the uplink case, where detection of all components are desirable.

The previous descriptions are of preferred examples for implementing the invention, and the scope of the invention should not necessarily be limited by this description. The scope of the present invention is defined by the following claims.

What is claimed is:

1. In a radio receiver operable to receive a receive signal, the receive signal formed of a wanted-signal component portion and at least one interfering-signal component portion, an improvement of apparatus for facilitating processing of the receive signal, said apparatus comprising:

a quality measure determiner coupled to receive at least indications of the receive signal, said quality measure determiner for forming at least one quality measure of the receive signal; and an interference detector also coupled to receive the at least indications of the receive signal and indications of the at least one quality measure of the receive signal determined by said quality measure determiner, said interference detector for detecting the wanted signal-component portion of the receive signal and for selectively detecting also the at least one interfering signal component portion to permit selective suppression of the at least one interfering signal component portion.

2. The apparatus of claim 1 wherein said interference detector is further selectively operable to detect the wanted signal-component portion without detecting the at least one interfering signal component portion.

3. In a radio receiver operable to receive a receive signal, the receive signal formed of a wanted-signal component and an interfering-signal component, the wanted-signal component having a first training sequence associated therewith and the at least one interfering-signal component portion having at least a second training sequence associated therewith, the first and the at least second training sequences, respectively, selected from a set of training sequences, the first training sequence of a value known to the receiver at least when the receive signal is received at the receiver, an improvement of apparatus at least for determining the value of the at least second training sequence, said apparatus comprising:

a channel estimator coupled to receive at least indications of the receive signal received at the receiver, said channel estimator for forming groups of channel estimates, the channel estimates of each group representative of characteristics of estimated channels, wherein said estimated channels are estimative of channels upon which the receive signal is transmitted to the receiver, the channel estimates of each group including estimates of channels upon which interfering signal component portions are transmitted, the interfering-signal component portions having associated therewith training sequences of the set of training sequences;

a residual interference estimator coupled to receive indications of estimates formed by said channel estimator, said residual interference estimator for generating values of residual interference for each of the groups of channel estimates formed by said channel estimator; and a selector coupled to receive the values of the residual interference estimated by said residual interference estimator, said selector for selecting a group of channel estimates of the groups of channel estimates estimated by said channel estimator which exhibit a value of residual interference, estimated by said residual interference estimator, of a desired value, the training sequence associated with the group of channel estimates selected by said selector determined to be the value of the at least second training sequence.

4. The apparatus of claim 3 wherein said channel estimator comprises a least mean square error estimator.

5. The apparatus of claim 4 wherein said least mean square estimator of which said channel estimator is formed calculates a least mean square channel estimate for an estimated-interfering signal having each training sequence of the set of training sequences but for the first training sequence associated with the wanted-signal component.

6. The apparatus of claim 3 wherein the groups of channel estimates estimated by said channel estimator comprise estimates of a wanted-signal component channel and interfering-signal component portion channels, the interfering-signal component portion channels estimative of channels upon which interfering-signal component portions having associated therewith training sequences of each training sequence of the group of training sequences but for the training sequence associated with the wanted-signal component.

7. The apparatus of claim 3 wherein said residual interference estimator estimates a value of residual interference for each of the groups of channel estimates.

8. The apparatus of claim 3 wherein said selector selects a group of channel estimates amongst the groups of the channel estimates which exhibits a lowest level of residual interference.

9. The apparatus of claim 3 further for suppressing the at least one interfering signal component portion, said apparatus further comprising:

an interference suppressor coupled to receive the at least indications of the receive signal and to receive indications of the at least second training sequence associated with the group of channels selected by said select and channel estimates formed by said channel estimator, said interference suppressor for selectively suppressing the at least one interfering signal component portion.

10. The apparatus of claim 9 wherein said interference suppressor comprises a joint detector, said joint detector for jointly detecting the values of the wanted-signal component and the values of the interfering signal component portion having the second training sequence.

11. The apparatus of claim 9 wherein said channel estimator further estimates a wanted-signal estimated channel, the wanted-signal estimated channel estimative of only the channel upon which the wanted-signal component is transmitted to the receiver.

12. The apparatus of claim 11 wherein said residual interference estimator is further coupled to receive indications of the wanted-signal estimated channel, said residual interference estimator further for generating a value of residual interference for the wanted-signal estimated channel.

13. The apparatus of claim 12 wherein said selector is further coupled to receive the value of residual interference of the wanted-signal estimated channel generated by said residual interference estimator, the wanted-signal estimated channel associated therewith forming an additional group of the groups of channel estimates amongst which said selector selects.

14. The apparatus of claim 13 further for detecting values of the wanted-signal component exclusive of the interfering signal component, said apparatus further comprising:

a wanted-signal detector coupled to receive the at least indications of the receive signal and to receive indications of selections by said selector selecting the wanted-signal estimated channel, said wanted-signal detector for detecting the values of the wanted-signal component.

15. The apparatus of claim 14 wherein said selector is further operable to select operation alternately of said joint detector and said wanted-signal detector.

16. The apparatus of claim 3 wherein the at least one interfering-signal component portion comprises a plurality of interfering-signal component portions and wherein the groups of channel estimates formed by said channel estimator include estimates of a plurality of channels upon which a plurality of interfering-signal component portions are transmitted.

17. In a method for receiving a receive signal at a radio receiver, the receive signal formed of a wanted-signal component portion and at least one interfering-signal component, the interfering-signal component formed of at least one interfering-signal component portion, the wanted-signal component portion having a first training sequence associated therewith and the at least one interfering-signal component portion having at least a second training sequence associated therewith, the first and second training sequences respectively, selected from a set of training sequences, the first training sequence of a value known to the receiver at least when the receive signal is received at the receiver, an improvement of a method for at least determining the value of the at least second training sequence, said method comprising the steps of:

estimating groups of channel estimates responsive to indications of the receive signal received at the receiver, the channel estimates of each group representative of characteristics of estimated channels, wherein said estimated channels are estimative of channels upon which the receive signal is transmitted to the receiver, the channel estimates of each group including estimates of channels upon which interfering-signal component portions are transmitted, the interfering-signal component portions having associated therewith training sequences of the group of training sequences;

generating values of residual interference for each of the groups of channel estimates estimated during said step of estimating; and selecting a group of channel estimates of the groups of channel estimates which exhibit a value of residual interference, generated during said step of generating values of residual interference of a desired value, the training sequence associated with the group of channel estimates determined to be the value of the at least second training sequence.

18. In a radio receiver operable to receive a receive signal, the receive signal formed of a wanted-signal component and an interfering-signal component having at least one interfering-signal component portion, the wanted-signal component having a first training sequence associated therewith and the at least one interfering-signal component portion having at least a second training sequence associated therewith, the first and second training sequences respectively, selected from a group of training sequences, the first training sequence of a value known to the receiver at least when the receive signal is received at the receiver, an improvement of an apparatus for estimating a channel upon which the receive signal is transmitted to the radio receiver, said apparatus comprising:

a joint detector selectably coupled to receive at least indications of the receive signal, said joint detector for jointly detecting the wanted-signal component transmitted upon a wanted-signal channel together with the at least one interfering component portion transmitted upon at least one interfering-signal channel;

a wanted-signal detector selectably coupled to receive at least indications of the receive signal, said wanted signal detector for detecting the wanted-signal component transmitted upon the wanted-signal channel; and a selector for selectably coupling said joint detector and said wanted signal detector to receive the at least indications of the receive signal.

* * * * *

UNITED STATES PATENT AND TRADEMARK OFFICE
CERTIFICATE OF CORRECTION

PATENT NO. : 5,933,768
DATED : August 3, 1999
INVENTOR(S) : Johan Sköld et al.

It is certified that error appears in the above-identified patent and that said Letters Patent is hereby corrected as shown below:

Column 14, Line 57     Replace "select" with -- selector --

Signed and Sealed this

Fifth Day of June, 2001

*Attest:*

NICHOLAS P. GODICI

*Attesting Officer*

*Acting Director of the United States Patent and Trademark Office*